US012577170B2

(12) United States Patent
Tsuchiya et al.

(10) Patent No.: US 12,577,170 B2
(45) Date of Patent: Mar. 17, 2026

(54) ZIRCONIA SINTERED BODY AND METHOD FOR PRODUCING THE SAME

(71) Applicant: TOSOH CORPORATION, Yamaguchi (JP)

(72) Inventors: Satoshi Tsuchiya, Yamaguchi (JP); Hiroyuki Fujisaki, Yamaguchi (JP); Hitoshi Nagayama, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 867 days.

(21) Appl. No.: 17/269,209

(22) PCT Filed: Aug. 7, 2019

(86) PCT No.: PCT/JP2019/031045
§ 371 (c)(1),
(2) Date: Feb. 17, 2021

(87) PCT Pub. No.: WO2020/039924
PCT Pub. Date: Feb. 27, 2020

(65) Prior Publication Data
US 2021/0403387 A1 Dec. 30, 2021

(30) Foreign Application Priority Data
Aug. 20, 2018 (JP) ................................. 2018-153790

(51) Int. Cl.
*C04B 35/64* (2006.01)
*B32B 18/00* (2006.01)
*C04B 35/488* (2006.01)

(52) U.S. Cl.
CPC .............. *C04B 35/64* (2013.01); *B32B 18/00* (2013.01); *C04B 35/488* (2013.01); *C04B 2235/3217* (2013.01); *C04B 2235/3225* (2013.01); *C04B 2235/3229* (2013.01); *C04B 2235/785* (2013.01); *C04B 2235/9661* (2013.01); *C04B 2237/348* (2013.01)

(58) Field of Classification Search
None
See application file for complete search history.

(56) References Cited

U.S. PATENT DOCUMENTS

| | | | |
|---|---|---|---|
| 6,200,916 B1 | 3/2001 | Michel et al. | |
| 2012/0139141 A1 | 6/2012 | Khan et al. | |
| 2012/0218736 A1* | 8/2012 | Zhang ..................... C04B 35/50 | |
| | | | 252/301.4 F |
| 2018/0222799 A1* | 8/2018 | Yamauchi ............. C04B 35/109 | |

FOREIGN PATENT DOCUMENTS

| | | | | |
|---|---|---|---|---|
| JP | 62-83366 A | 4/1987 | | |
| JP | 11-322418 A | 11/1999 | | |
| JP | 2015-832 A | 1/2015 | | |
| JP | 2017-75086 A | 4/2017 | | |
| JP | 2017114758 A | * 6/2017 | .............. | B28B 1/24 |
| JP | 2018-80064 A | 5/2018 | | |

OTHER PUBLICATIONS

Translation ; JP 2017114758-A; Ito et al; Jun. 29, 2017 (Year: 2017).*
International Search Report issued in International Patent Application No. PCT/JP2019/031045, dated Oct. 8, 2019, along with English Translation thereof.
Written Opinion of the International Searching Authority issued in International Patent Application No. PCT/JP2019/031045, dated Oct. 8, 2019, along with English Translation thereof.

* cited by examiner

*Primary Examiner* — David Sample
(74) *Attorney, Agent, or Firm* — Greenblum & Bernstein, P.L.C.

(57) ABSTRACT

A complex sintered body includes a lamination of a layer composed of a zirconia sintered body containing 0.5% or more by mole and less than 4% by mole of an oxide of cerium in terms of $CeO_2$, 2% or more by mole and less than 6% by mole of yttria and 0.1% or more by mass and less than 2% by mass of an oxide of aluminum; and at least one of a layer composed of a zirconia-based sintered body containing 2.0% or more by mass and 20.0% or less by mass of an oxide of aluminum, and a layer composed of a zirconia-based sintered body containing 2% or more by mole and less than 6% by mole of yttria and a coloring agent.

18 Claims, No Drawings

ZIRCONIA SINTERED BODY AND METHOD FOR PRODUCING THE SAME

TECHNICAL FIELD

The present disclosure relates to a zirconia sintered body that contains cerium oxide and that exhibits a red color. In particular, the present disclosure relates to a zirconia sintered body that has suitable strength as an exterior member, such as a decorative member, and that exhibits a bright red color.

BACKGROUND ART

Coloring agent-containing zirconia sintered bodies, what are so-called colored zirconia sintered bodies, are required for use in decorative members and exterior components of electronic device materials. Hitherto, zirconia sintered bodies exhibiting reddish colors have been studied, as colored zirconia sintered bodies. Cerium oxide ($CeO_2$) has been receiving attention as a coloring agent.

For example, zirconia sintered bodies containing 0.5% by mole or more of $CeO_2$ as a coloring agent and composed of tetragonal zirconia obtained by reducing cerium have been reported (PTL 1). These sintered bodies have colors close to brown, such as orange, brown and dark red.

A method for producing orange/red zirconia has been reported, the method including firing a zirconia powder containing 3% to 20% by mass of a stabilizer, such as yttria or ceria, 0.1% to 55% by mass of a powder for forming a glass phase and 0.01% to 10% by mass of copper oxide (PTL 2). The sintered body disclosed in PTL 2 is colored by mainly copper nanoparticles.

A zirconia sintered body that contains an oxide of cerium containing trivalent cerium, yttria and an oxide of aluminum has been reported as a sintered body having aesthetic properties as a pure red color and exhibiting an extremely small change in color depending on the thickness of the sintered body (PTL 3).

CITATION LIST

Patent Literature

PTL 1: Japanese Unexamined Patent Application Publication No. 62-83366
PTL 2: Japanese Unexamined Patent Application Publication No. 11-322418
PTL 3: Japanese Unexamined Patent Application Publication No. 2017-75086

SUMMARY OF INVENTION

Technical Problem

The zirconia sintered bodies described in PTL 1 and PTL 2, do not have aesthetic properties as a pure red color, whereas the zirconia sintered body described in PTL 3 is a zirconia sintered body that exhibits a pure red color by use of a color produced by cerium oxide. On the other hand, the color of the sintered body described in PTL 3 changes little when the thickness is changed. It is thus difficult to change the color while the composition of the sintered body remains completely the same.

In view of these problems, it is an object of the present disclosure to provide a structure of a zirconia sintered body exhibiting a bright red color by use of a color produced by cerium oxide, the structure enabling a change in the visually perceived color of a surface without changing the composition.

Solution to Problem

The inventors have conducted studies on a zirconia sintered body exhibiting a red color and containing cerium oxide as a coloring agent and, as a result, have found that when a red zirconia sintered body containing cerium oxide serving as a coloring agent is a complex sintered body, the visually perceived color of a surface changes without changing the composition of the red zirconia sintered body itself. The findings have led to the completion of the present invention.

Specifically, the gist of the present disclosure is described below.

[1] A complex sintered body characterized by comprising: lamination of a layer composed of a zirconia sintered body containing 0.5% or more by mole and less than 4% by mole of an oxide of cerium in terms of $CeO_2$, 2% or more by mole and less than 6% by mole of yttria and 0.1% or more by mass and less than 2% by mass of an oxide of aluminum, the balance being zirconia, the oxide of cerium containing trivalent cerium, and the zirconia having a crystal structure including a tetragonal; and at least one of a layer composed of a zirconia-based sintered body containing 2.0% or more by mass and 20.0% or less by mass of an oxide of aluminum, the balance being zirconia containing 2% or more by mole and less than 6% by mole of yttria, and a layer composed of a zirconia-based sintered body containing 2% or more by mole and less than 6% by mole of yttria and a coloring agent, the balance being zirconia, a lightness $L^*$ being 10 or more and 75 or less, a hue $a^*$ being $-3$ or less or 3 or more, a hue $b^*$ being $-3$ or less or 3 or more, and a chroma $C^*$ being 1 or more and 30 or less in an $L^*a^*b^*$ color system.

[2] The complex sintered body described in [1], characterized in that the lamination includes the layer composed of the zirconia sintered body containing 0.5% or more by mole and less than 4% by mole of the oxide of cerium in terms of $CeO_2$, 2% or more by mole and less than 6% by mole of yttria and 0.1% or more by mass and less than 2% by mass of the oxide of aluminum, the balance being zirconia, the oxide of cerium containing trivalent cerium, the zirconia having the crystal structure including the tetragonal; and the layer composed of the zirconia-based sintered body containing 2.0% or more by mass and 20.0% or less by mass of the oxide of aluminum, the balance being zirconia containing 2% or more by mole and less than 6% by mole of yttria.

[3] The complex sintered body described in [1] or [2], in which the zirconia-based sintered body contains 2.0% or more by mass and less than 20.0% by mass of the oxide of aluminum. [4] The complex sintered body described in any one of [1] to [3], in which the zirconia-based sintered body has a reflectance of 50% or more at a sample thickness of 2.5 mm and a measurement wavelength of 650 nm.

[5] The complex sintered body described in any one of [1] to [4], in which the zirconia-based sintered body has a color with a lightness $L^*$ of 70 or more and 100 or less, a hue $a^*$ of more than $-3$ and less than 3 and a hue $b^*$ of more than $-3$ and less than 3 in the $L^*a^*b^*$ color system.

[6] The complex sintered body described in [1], characterized in that the lamination includes the layer composed of the zirconia sintered body containing 0.5% or more by mole and less than 4% by mole of the oxide of cerium in terms of $CeO_2$, 2% or more by mole and less than 6% by mole of yttria, and 0.1% or more by mass and less than 2% by mass of the oxide of aluminum, the balance being zirconia, the oxide of cerium containing trivalent cerium, the zirconia having the crystal structure including the tetragonal; and the layer composed of the zirconia-based sintered body containing 2% or more by mole and less than 6% by mole of yttria and the coloring agent, the balance being zirconia, the lightness L* being 10 or more and 75 or less, the hue a* being −3 or less or 3 or more, the hue b* being −3 or less or 3 or more, the chroma C* being 1 or more and 30 or less in the L*a*b* color system.

[7] The complex sintered body described in [6], in which the ratio of the reflectance of the zirconia-based sintered body at a sample thickness of 0.3 mm and a measurement wavelength of 580 nm to the reflectance at a measurement wavelength of 650 nm is 0.7 or more and 2.5 or less. [8] The complex sintered body described in [6] or [7], in which the coloring agent is one or more elements selected from the group consisting of manganese (Mn), iron (Fe), cobalt (Co), nickel (Ni), copper (Cu), titanium (Ti), zinc (Zn), aluminum (Al), lanthanum (La), praseodymium (Pr), neodymium (Nd), europium (Eu), gadolinium (Gd), terbium (Tb), dysprosium (Dy), holmium (Ho), erbium (Er) and ytterbium (Yb).

[9] The complex sintered body described in any one of [6] to [8], in which the coloring agent is contained in an amount of 0.01% or more by mass and 30% or less by mass.

[10] The complex sintered body described in any one of [1] to [9], in which zirconia crystal grains in the zirconia sintered body have an average crystal grain size of 2 μm or less.

[11] The complex sintered body described in any one of [1] to [10], in which the layer composed of the zirconia sintered body has a color satisfying 20≤L*≤60, 30≤a*≤60 and 0.9≤a*/b*

[12] The complex sintered body described in any one of [1] to [11], in which the oxide of aluminum in the layer composed of the zirconia sintered body is one or more compounds selected from the group consisting of spinel, lanthanum aluminate and aluminum oxide.

[13] The complex sintered body described in any one of [1] to [11], in which the ratio of the thickness of the zirconia-based sintered body to the thickness of the layer composed of the zirconia sintered body is 0.5 or more and 10.0 or less.

[14] A method for producing the complex sintered body described in any one of [1] to [13], comprising:

a sintering step of sintering a green body in a reducing atmosphere, the green body including a layer containing 2% or more by mole and less than 6% by mole of yttria, 0.5% or more by mole and less than 4% by mole of an oxide of cerium in terms of $CeO_2$ and 0.1% or more by mass and less than 2% by mass of an oxide of aluminum, the balance being zirconia; and at least one of a layer containing 2% or more by mole and less than 6% by mole of yttria and 2.0% or more by mass and 20.0% or less by mass of an oxide of aluminum, the balance being zirconia, and a layer containing 2% or more by mole and less than 6% by mole of yttria and a coloring agent, the balance being zirconia.

[15] The method for producing the complex sintered body described in [14], in which the sintering step includes a primary sintering step of subjecting the green body to pressureless sintering in an oxidizing atmosphere to produce a primary sintered body and a secondary sintering step of subjecting the primary sintered body to pressureless sintering in a reducing atmosphere.

[16] A member, comprising the complex sintered body described in any one of [1] to [13].

Advantageous Effects of Invention

The present disclosure can provide a structure of a zirconia sintered body exhibiting a bright red color by use of the color produced by cerium oxide, the structure enabling a change in the visually perceived color of a surface without changing the composition.

DESCRIPTION OF EMBODIMENTS

Embodiments of the complex sintered body according to the present disclosure will be described below with reference to examples.

An embodiment is related to a complex sintered body comprising:

a lamination of a layer (hereinafter, also referred to as a "surface layer") composed of a zirconia sintered body containing 0.5% or more by mole and less than 4% by mole of an oxide of cerium in terms of $CeO_2$, 2% or more by mole and less than 6% by mole of yttria and 0.1% or more by mass and less than 2% by mass of an oxide of aluminum, the balance being zirconia, the oxide of cerium containing trivalent cerium, and the zirconia having a crystal structure including a tetragonal; and at least one of a layer composed of a zirconia-based sintered body containing 2.0% or more by mass and 20.0% or less by mass of an oxide of aluminum, the balance being zirconia containing 2% or more by mole and less than 6% by mole of yttria, and a layer composed of a zirconia-based sintered body containing 2% or more by mole and less than 6% by mole of yttria and a coloring agent, the balance being zirconia, a lightness L* being 10 or more and 75 or less, a hue a* being −3 or less or 3 or more, a hue b* being −3 or less or 3 or more, a chroma C* being 1 or more and 30 or less in an L*a*b* color system (hereinafter, the at least one of the layers is also referred to as a "base layer").

This structure enables a change in the visually perceived color of the surface layer without changing the composition of the sintered body itself. This facilitates fine adjustment of the visually perceived red color of the sintered body at the stage of post treatment, such as processing into a member, after sintering.

The complex sintered body according to this embodiment is a sintered body having a structure in which two or more sintered bodies having different compositions are laminated. The complex sintered body is preferably a sintered body having a structure in which two or more sintered bodies having different compositions are laminated by sintering because the complex sintered body is easily handled when processed into various members. The complex sintered body having a structure in which sintered bodies are laminated by sintering is formed, for example, by sintering a green body having a structure in which two or more layers are laminated.

In the complex sintered body of the embodiment, the surface layer and the base layer are laminated, and, preferably, the surface layer and the base layer are laminated by sintering. That is, the complex sintered body of the embodiment is preferably a sintered body having a structure in which the surface layer and the base layer are laminated, the layers being composed of sintered bodies and sintered with each other. Processing the surface layer of the sintered body after sintering enables fine adjustment of the visually perceived color of the surface layer, since the surface layer and the base layer are laminated. The complex sintered body of the embodiment may include a layer other than the surface layer or the base layer and may have a structure in which three or more layers composed of sintered bodies are laminated.

The complex sintered body of the embodiment may have a shape and size appropriate for the intended use. In the case where the complex sintered body of the embodiment is used as one of various members, for example, the complex sintered body has a thickness of 0.1 mm or more and 10.0 mm or less, preferably 0.5 mm or more and 8.0 mm or less, more preferably 1.0 mm or more and 5.0 mm or less, even more preferably 2.0 mm or more and 4.0 mm or less.

A thickness of each of the surface layer and the base layer is arbitrary. The ratio of the thickness of the base layer to the thickness of the surface layer is preferably 0.5 or more and 10.0 or less, more preferably 3.5 or more and 9.0 or less, preferably 4.0 or more and 8.0 or less.

An embodiment of the present disclosure is related to a complex sintered body characterized in that a lamination includes a layer (surface layer) composed of a zirconia sintered body containing 0.5% or more by mole and less than 4% by mole of an oxide of cerium in terms of $CeO_2$, 2% or more by mole and less than 6% by mole of yttria and 0.1% or more by mass and less than 2% by mass of an oxide of aluminum, the balance being zirconia, the oxide of cerium containing trivalent cerium, and the zirconia having a crystal structure including a tetragonal; and a layer (base layer; hereinafter, the base layer is also referred to as an "achromatic layer") composed of a zirconia-based sintered body containing 2.0% or more by mass and 20.0% or less by mass of an oxide of aluminum, the balance being zirconia containing 2% or more by mole and less than 6% by mole of yttria. This structure enables a change in the visually perceived color of the surface layer by simply adjusting the thickness of the surface layer without changing the composition of the sintered body itself, and thus facilitates fine adjustment of the red color of the surface layer after sintering.

The surface layer is composed of the zirconia sintered body (hereinafter, also referred to as a "red sintered body") containing 0.5% or more by mole and less than 4% by mole of the oxide of cerium in terms of $CeO_2$, 21 or more by mole and less than 6% by mole of yttria and 0.1% or more by mass and less than 2% by mass of the oxide of aluminum, the balance being zirconia, the oxide of cerium containing trivalent cerium, and the zirconia having a crystal structure including a tetragonal.

The red sintered body contains yttria. Yttrium functions as a stabilizer without coloring zirconia. The yttria content is 2% or more by mole and less than 6% by mole, preferably 2% or more by mole and 5% or less by mole, more preferably 2% or more by mole and 45 or less by mole. The yttria content may be 2.5% or more by mole and 3.5% or less by mole.

The yttria content (r by mole) of the red sintered body is the percentage by mole of yttria based on the total of zirconia and yttria in the red sintered body.

The red sintered body may contain a compound functioning as a stabilizer without coloring zirconia, for example, at least one of calcia and magnesia.

The red sintered body contains the oxide of cerium. Cerium functions as a stabilizer for zirconia and becomes trivalent cerium ($Ce^{3+}$) in zirconia to exhibit a reddish color. The amount of the oxide of cerium contained in the red sintered body is, in terms of $CeO_2$, 0.5% or more by mole and less than 4% by mole, or 0.5% or more by mole and 3% or less by mole, or 0.5, or more by mole and 2.5% or less by mole. The amount of the oxide of cerium contained is particularly preferably 0.6% or more by mole and 1.6% or less by mole, more particularly preferably 0.6% or more by mole and 1.2% or less by mole.

The amount (% by mole) of the oxide of cerium contained in the red sintered body is determined as the percentage by mole of the oxide of cerium in terms of $CeO_2$ based on the total of zirconia, yttria, the oxide of cerium in terms of $CeO_2$ and the oxide of aluminum in terms of $Al_2O_3$ in the red sintered body, i.e., $(CeO_2/(ZrO_2+Y_2O_3+CeO_2+Al_2O_3))$.

The red sintered body contains trivalent cerium ($Ce^{2+}$). A higher trivalent cerium content results in the zirconia sintered body having a color closer to red. Thus, the oxide of cerium contained in the red sintered body preferably has a higher trivalent cerium content. The percentage by mole of trivalent cerium is preferably 50% or more, more preferably 60% or more, even more preferably 70% or more, still even more preferably 80% or more based on the total cerium in the oxide of cerium. The percentage by mole of trivalent cerium is 100% or less.

When the red sintered body is fired at 800° C. or higher in an oxidizing atmosphere, a reaction represented by the following formula occurs. That is, trivalent cerium is oxidized by the firing in the oxidizing atmosphere.

$$\tfrac{1}{2}Ce_2O_3 + \tfrac{1}{4}O_2 \rightarrow CeO_2$$

The increase in the mass of the sintered body after sintering can be regarded as the amount of trivalent cerium contained in the red sintered body. In the embodiment, thus, the percentage by mole of trivalent cerium can be calculated from the following formula:

$$Ce^{3+} \ (\% \text{ by mole}) = [\{(W_2 - W_1)/W_0\} \times 4]/M_{Ce} \times 100$$

In the above formula, $W_1$ is the mass (g) of the red sintered body. $W_2$ is the mass (g) of the sintered body after firing in the oxidizing atmosphere. $W_0$ is the amount of substance of oxygen (32.0 g/mol). $M_{Ce}$ is the cerium content (mol) of the sintered body. The conditions for the firing in the oxidizing atmosphere when $W_2$ is determined may be conditions such that an increase in the mass of $W_2$ reaches equilibrium. A preferred example of the firing conditions is pressureless sintering in air at 1,050° C. or higher and 1,400° C. or lower for 1 hour or more and 10 hours or less. The cerium content of the sintered body can be determined by composition analysis, such as an ICP measurement.

The red sintered body contains the oxide of aluminum. The oxide of aluminum is present in the form of crystal grains different from those of zirconia. The presence of the zirconia crystal grains and the crystal grains of the oxide of aluminum in the red sintered body enables the crystal grains of the oxide of aluminum to appropriately reflect a color produced by trivalent cerium in the zirconia crystal grains. Preferably, the crystal grains of the oxide of aluminum are not aggregated in the sintered body but are present in an irregularly dispersed state. The irregular dispersion of the crystal grains of the oxide of aluminum leads to complex reflection of the color produced by trivalent cerium. This results in a uniform, bright red color throughout the red sintered body. The crystal grains of the oxide of aluminum are preferably dispersed. Thus, for example, in the red sintered body, the crystal grains of the oxide of aluminum do not form grain boundaries, or there are few grain boundaries between the crystal grains of the oxide of aluminum.

The oxide of aluminum contained in the red sintered body preferably has a crystal grain size of 0.5 μm or more and 3 μm or less.

Regarding the amount of the oxide of aluminum contained, the percentage by mass of the oxide of aluminum in terms of aluminum oxide ($Al_2O_3$) is 0.1% or more by mass and less than 2% by mass, or 0.2% or more by mass and 1.2% or less by mass based on the mass of the red sintered body. When the amount of the oxide of aluminum contained is less than 0.1% by mass, the oxide of aluminum cannot be sufficiently dispersed in the red sintered body; thus, the surface and the inside of the red sintered body tend to be different in color. When the amount of the oxide of aluminum contained is 2% or more by mass, an excessively large number of crystal grains of the oxide of aluminum are present in the red sintered body. This results in excessive reflection to cause the red sintered body to have a color other than red, for example, orange to yellow. The amount of the oxide of aluminum contained is preferably 0.2% or more by mass and 15 or less by mass, more preferably 0.21, or more by mass and 0.8% or less by mass, even more preferably 0.21 or more by mass and 0.6% or less by mass.

The oxide of aluminum is an aluminum-containing oxide and may be any aluminum-containing oxide having a color similar to the color of aluminum oxide (alumina: $Al_2O_3$). The oxide of aluminum contained in the red sintered body may be at least one of aluminum-containing composite oxides and aluminum oxide ($Al_2O_3$), or one or more compounds selected from the group consisting of spinel ($MgAl_2O_4$), lanthanum aluminate ($LaAl_{11}O_{19}$) and aluminum oxide, or aluminum oxide.

The red sintered body may contain impurities to the extent that the color is not affected by the impurities. However, each of the silica content and the titania content of the red sintered body is preferably less than 0.1% by mass, more preferably 0.05% or less by mass, based on the mass of the red sintered body. Even more preferably, the red sintered body contains neither silica nor titania (0% by mass). Considering an error in composition analysis, each of the silica content and the titania content of the red sintered body is preferably 0.001% or less by mass, and may be 0% or more by mass and 0.05% or less by mass, or 0% or more by mass and 0.001% or less by mass. Silica easily forms coarse grains in a sintered body. The coarse silica grains formed in the sintered body produce white spots having a visually observable size. In the case where coarse silica grains are contained, a zirconia sintered body having a uniform red color is not formed. Titania, sintered in a reducing atmosphere, exhibits a black color. When titania is contained, a blackish color is exhibited. Thus, a zirconia sintered body exhibiting a bright red color is not formed. To resolve the blackening of titania, it is known that a sintered body is reoxidized. In the red sintered body, however, reoxidation oxidizes trivalent cerium. This results in a sintered body that exhibits an orange color different from red. Preferably, the red sintered body contains no glass phase.

The red sintered body has a crystal structure that includes a tetragonal, and the main phase of the crystal structure is preferably a tetragonal. The crystal structure of the red sintered body may be a mixed phase of a tetragonal and a cubic. The tetragonal has a crystal structure having an optical anisotropy. The presence of the tetragonal facilitates the reflection of light. Thus, the red sintered body has a color that does not have translucency and exhibits a distinct red color. Preferably, the red sintered body has high strength, since the main phase of the crystal structure is a tetragonal.

The crystal structure may be determined from an XRD pattern. For example, the XRD pattern can be measured with a typical X-ray diffractometer (for example, Ultima IV, available from Rigaku Corporation) under conditions described below.

Radiation source: CuKα radiation (λ=0.15418 nm)

Measurement mode: continuous scan

Scan rate: 4°/min

Step size: 0.02°

Measurement range: 2θ=26° to 33°

In the XRD pattern, a crystal structure exhibiting a peak with the maximum intensity among XRD peaks corresponding to zirconia having a crystal structure of a tetragonal, a cubic or a monoclinic is defined as the main phase. The XRD peak of tetragonal zirconia and cubic zirconia is observed as an XRD peak with a peak maximum at 2θ=30±0.5°. In the embodiment, in the case where the peak is present, the crystal structure may be considered to contain at least a tetragonal and may also be considered to be a mixed phase of a tetragonal and a cubic.

The zirconia crystal grains of the red sintered body preferably have an average crystal grain size of 2 μm or less, more preferably 1 μm or less. An average crystal grain size of the zirconia crystal grains of 2 μm or less results in strength sufficient to be used as a member, such as a decorative piece. The average crystal grain size may be 0.4 μm or more, or 0.6 μm or more.

In the embodiment, the average crystal grain size of zirconia can be determined by measuring the crystal grain sizes of 200 or more, preferably 225±25, zirconia crystal grains observed in a scanning electron microscope (hereinafter, referred to as a "SEM") observation image of the sintered body using an intercept method and averaging the crystal grain sizes. For example, the average crystal grain size of zirconia is measured as follows. A sintered body that has been mirror-polished and then thermally etched is used as a measurement sample. As the SEM observation image, an SEM observation image obtained by observing a surface layer of the sintered body at a magnification of ×20,000 is used. The crystal grain sizes of the zirconia crystal grains are measured from the SEM observation image by the intercept method (k=1.78). The total value of the measured crystal grain sizes is divided by the number of the crystal grains.

The red sintered body contains the zirconia crystal grains and the crystal grains of the oxide of aluminum. The color of the crystal grains of the oxide of aluminum, which are indefinite in shape, is different from the color of the zirconia crystal grains, which are the matrix (matrix phase), in the SEM observation image. Thus, the two can be clearly distinguished.

Regarding the color of the surface layer in an $L^*a^*b^*$ color system, for example, the lightness $L^*$ is 20 or more, the hue $a^*$ is 30 or more and the ratio of the hue $a^*$ to the hue $b^*$ (hereinafter, also referred to as "$a^*/b^*$") is $0.9 \leq a^*/b^*$.

The surface layer does not satisfy only one or two of the above lightness L*, hue a* and a*/b*, but satisfies all of the above lightness L*, hue a* and a*/b*, thereby exhibiting a red color rather than a color close to red.

The surface layer preferably has a color satisfying $20 \leq L^* \leq 60$, $30 \leq a^* \leq 60$ and $0.9 \leq a^*/b^*$, more preferably $20 \leq L^* \leq 40$, $30 \leq a^* \leq 50$ and $0.9 \leq a^*/b^* \leq 1.4$, even more preferably $20 \leq L^* \leq 35$, $35 \leq a^* \leq 45$ and $0.9 \leq a^*/b^* \leq 1.2$. The color particularly preferably satisfies $21 \leq L^* \leq 30$, $36 \leq a^* \leq 45$ and $0.9 \leq a^*/b^* \leq 1.1$ or satisfies $20 \leq L^* \leq 40$, $35 \leq a^* \leq 60$ and $0.9 \leq a^*/b^* \leq 1.2$.

In the embodiment, the color and the reflectance can be measured by a method according to JIS Z 8722. The color and the reflectance can be determined in SCE mode in which specularly reflected light is excluded and diffusely reflected light is measured; thus, the color and the reflectance can be evaluated in a state closer to visual observation. For example, the color can be measured under the conditions described below.

Colorimeter: CM-700d (available from Konica Minolta, Inc.)

Illuminant: illuminant D65

Observer angle: 10°

Measurement mode: SCE mode

Standard sample: white calibration cap (product name: CM-A177, available from Konica Minolta, Inc.)

In the embodiment, for example, the surface layer has a thickness of 3 mm or less, preferably 0.5 mm or less. For example, the surface layer has a thickness of 0.1 mm or more and 1.0 mm or less, preferably 0.2 mm or more and 0.4 mm or less.

The reflectance is the percentage (%) of the luminous flux of diffusely reflected light based on the luminous flux of incident light.

The base layer (achromatic layer) is composed of a sintered body (hereinafter, also referred to as an "achromatic sintered body") containing 2% or more by mole and less than 6% by mole of yttria and 2.0% or more by mass and 20.0% or less by mass of the oxide of aluminum, the balance being zirconia. In the case where the achromatic sintered body and the surface layer are laminated, the visually perceived color of the surface layer can be changed by simply adjusting the thickness of the surface layer without changing the composition of the sintered body itself.

The achromatic sintered body contains yttria. Yttrium functions as a stabilizer without coloring zirconia. The yttria content is 2% or more by mole and less than 6% by mole, preferably 2% or more by mole and 4% or less by mole.

The yttria content (% by mole) of the achromatic sintered body refers to the percentage by mole of yttria based on the total of zirconia and yttria in the achromatic sintered body.

The achromatic sintered body may contain a compound functioning as a stabilizer without coloring zirconia, for example, at least one of calcia and magnesia.

The achromatic sintered body has a crystal structure that includes a tetragonal, and the main phase of the crystal structure is preferably a tetragonal. The crystal structure of the achromatic sintered body may be a mixed phase of a tetragonal and a cubic. The tetragonal has a crystal structure having an optical anisotropy.

Regarding the amount of the oxide of aluminum contained, the percentage by mass of the oxide of aluminum in terms of aluminum oxide ($Al_2O_3$) is 2.0% or more by mass and 20.0% or less by mass, preferably 2.0% or more by mass and less than 20.0% by mass, more preferably 5.0% or more by mass and 10.0% or less by mass, even more preferably 5.5% or more by mass and 10.0% or less by mass based on the mass of the sintered body.

The oxide of aluminum is an aluminum-containing oxide and may be any aluminum-containing oxide having a color similar to the color of aluminum oxide (alumina: $Al_2O_3$). The oxide of aluminum contained in the achromatic sintered body may be at least one of aluminum-containing composite oxides and aluminum oxide ($Al_2O_3$), or one or more compounds selected from the group consisting of spinel ($MgAl_2O_4$), lanthanum aluminate ($LaAl_{11}O_{19}$) and aluminum oxide, or aluminum oxide.

The achromatic sintered body may contain impurities to the extent that the color is not affected by the impurities. However, the achromatic sintered body preferably has a titania content of less than 0.1% by mass, more preferably 0.05% or less by mass, based on the mass of the achromatic sintered body. Even more preferably, the achromatic sintered body contains no titania (0% by mass). Considering an error in composition analysis, the achromatic sintered body preferably has a titania content of 0% or more by mass and 0.001% or less by mass.

The achromatic sintered body has a crystal structure that includes a tetragonal, and the main phase of the crystal structure is preferably a tetragonal. The crystal structure of the base sintered body may be a mixed phase of a tetragonal and a cubic. The tetragonal has a crystal structure having an optical anisotropy.

The zirconia crystal grains of the achromatic sintered body preferably have an average crystal grain size of 2 μm or less, more preferably 1 μm or less. For example, the zirconia crystal grains have an average crystal grain size of 0.5 μm or more.

The achromatic sintered body preferably has a reflectance of 50% or more, more preferably 70% or more, at a sample thickness of 2.5 mm and a measurement wavelength of 650 nm (hereinafter, also referred to as "reflectance (650)"). A higher reflectance (650) is more preferred. For example, the upper limit thereof may be 100% or less, or 90% or less.

The color of the achromatic sintered body preferably has a lightness L* of 70 or more and 100 or less, a hue a* of more than −3 and less than 3 and a hue b* of more than −3 and less than 3, more preferably a lightness L* of 80 or more and 100 or less, a hue a* of −1 or more and 1 or less and a hue b* of −1 or more and 1 or less, in the L*a*b* color system.

Another embodiment of the present disclosure is related to a complex sintered body characterized in that a lamination includes a layer (surface layer) composed of a zirconia sintered body containing 0.5, or more by mole and less than 4% by mole of an oxide of cerium in terms of $CeO_2$, 2% or more by mole and less than 6% by mole of yttria and 0.1% or more by mass and less than 2% by mass of an oxide of aluminum, the balance being zirconia, the oxide of cerium containing trivalent cerium, the zirconia having a crystal structure including a tetragonal; and a layer (base layer; hereinafter, the base layer is also referred to as a "chromatic layer") composed of a zirconia-based sintered body containing 2% or more by mole and less than 6% by mole of yttria and a coloring agent, the balance being zirconia, a lightness L* being 10 or more and 75 or less, a hue a* being −3 or less or 3 or more, a hue b* being −3 or less or 3 or more, a chroma C* being 1 or more and 30 or less in the L*a*b* color system.

In the case of the complex sintered body having a structure in which the surface layer and the chromatic layer are laminated, the visually perceived color of the surface layer can be changed by simply adjusting the thickness of the surface layer without changing the composition of the sintered body itself. In addition, the visually perceived color of the surface layer can be a more intense red color. This enables fine adjustment of the red color after sintering and facilitates the exhibition of a more intense red color of the surface layer even when the complex sintered body is processed into a thin member, compared with a single red sintered body.

The base layer (chromatic layer) according to this embodiment is composed of the zirconia-based sintered body (hereinafter, also referred to as a "chromatic sintered body") containing 2% or more by mole and less than 6% by mole of yttria and the coloring agent, the balance being zirconia, the lightness L* being 10 or more and 75 or less, the hue a* being −3 or less or 3 or more, the hue b* being −3 or less or 3 or more, the chroma C* being 1 or more and 30 or less in the L*a*b* color system.

The chromatic sintered body has a lightness L* of 10 or more and 75 or less, a hue a* of −3 or less or 3 or more, a hue b* of −3 or less or 3 or more and a chroma C* of 1 or more and 30 or less in the L*a*b* color system. The chroma C* is determined from the following formula:

$$\text{Chroma } C^* = \{(\text{hue } a^*)^2 + (\text{hue } b^*)^2\}^{1/2}$$

Preferred examples of the color of the chromatic sintered body include L*, a*, b* and C* described below.

In the complex sintered body of the embodiment, the chromatic sintered body may be different from the red sintered body in at least one of the lightness L*, the hue a*, the hue b* and the chroma C*.

Lightness L*: 15 or more and 75 or less,
  preferably 30 or more and 75 or less,
  more preferably 60 or more and 75 or less;
Hue a*: −20 or more and −3 or less, or 3 or more and 20 or less,
  preferably −18 or more and −10 or less, or 3 or more and 15 or less;
Hue b*: −30 or more and −3 or less, or 3 or more and 40 or less,
  preferably −30 or more and −3 or less, or 10 or more and 20 or less,
  more preferably −30 or more and −5 or less, and;
Chroma C*: 3 or more and 30 or less,
  preferably 4 or more and 25 or less,
  more preferably 10 or more and 23 or less.

In the case of the structure in which the chromatic sintered body having such a color and the surface layer are laminated, the complementary color of the color of the red sintered body is reduced, compared with the single red sintered body. Moreover, a yellowish color tends to be reduced. This facilitates the intensification of the redness of the visually perceived color of the surface layer. In contrast, in the case where a base layer that does not satisfy such a color and the surface layer are laminated, the redness of the surface layer tends to be similar to that of a single red sintered body. Moreover, the visually perceived redness of the surface layer may be weakened.

In the embodiment, an example of an index of redness is the difference between the hue a* and the hue b* (hereinafter, also referred to as "(a*−b*)"). As this value is larger, the visually perceived redness of the surface layer tends to be more intense. In the case of the structure of the complex sintered body of the embodiment, the difference (hereinafter, also referred to as "Δ(a*−b*)") when the (a*−b*) value of a single red sintered body (for example, a red sintered body in a state in which it is not laminated on the chromatic layer)

is subtracted from the (a*−b*) value of the surface layer is preferably 1.7 or more and 5.0 or less, more preferably 1.9 or more and 4.5 or less, even more preferably 2.0 or more and 4.0 or less.

The (a*−b*) of the surface layer varies for each surface layer because it depends on the original color of the red sintered body contained in the complex sintered body, and, for example, may be 0.3 or more and 2.5 or less, or 0.5 or more and 2.0 or less, or 0.6 or more and 1.9 or less.

The ratio of the reflectance of the chromatic sintered body at a sample thickness of 0.3 mm and a measurement wavelength of 580 nm to the reflectance at a measurement wavelength of 650 nm (hereinafter, also referred to as a "reflectance ratio") is preferably 0.7 or more and 2.5 or less, more preferably 0.9 or more and 2.0 or less. A structure in which a layer composed of the chromatic sintered body having such a reflectance ratio and the surface layer are laminated facilitates the visual recognition of the color of the surface layer as a color with more intense redness.

The chromatic sintered body contains yttria. Yttrium functions as a stabilizer without coloring zirconia. The yttria content is 2% or more by mole and less than 6% by mole, preferably 2% or more by mole and 4% or less by mole.

The yttria content (% by mole) of the chromatic sintered body is determined as the percentage by mole of yttria based on the total of zirconia and yttria in the chromatic sintered body.

The chromatic sintered body may contain a compound functioning as a stabilizer for zirconia, for example, at least one of calcia and magnesia.

The chromatic sintered body contains the coloring agent. The coloring agent is an element that has the function of coloring the zirconia-based sintered body. Any type and amount of coloring agent may be used as long as the chromatic sintered body is a sintered body having the color described above. The coloring agent may be, for example, one or more elements selected from the group consisting of transition metals, typical metals, and lanthanoid series rare-earth elements. The coloring agent is preferably one or more elements selected from the group consisting of manganese (Mn), iron (Fe), cobalt (Co), nickel (Ni), copper (Cu), titanium (Ti), zinc (Zn), aluminum (Al), lanthanum (La), praseodymium (Pr), neodymium (Nd), europium (Eu), gadolinium (Gd), terbium (Tb), dysprosium (Dy), holmium (Ho), erbium (Er) and ytterbium (Yb), more preferably one or more elements selected from the group consisting of iron, cobalt, nickel, titanium, aluminum, neodymium, gadolinium and erbium, even more preferably one or more elements selected from the group consisting of iron, cobalt, nickel, titanium, aluminum and neodymium.

The coloring agent may be present in any state in the chromatic sintered body. For example, the coloring agent may be in at least one of an oxide state and a state in which it is dissolved in zirconia. The oxide may be a complex oxide containing two or more coloring agents.

For example, the coloring agent content is 0.01% or more by mass and 30% or less by mass, preferably 0.01% or more by mass and 10% or less by mass, more preferably 0.1% or more by mass and 8% or less by mass, even more preferably 0.3% or more by mass and 5% or less by mass. The coloring agent content is the percentage (by mass) of the total mass of the elements on an oxide basis with respect to the mass of the chromatic sintered body.

In the case of converting each of the elements into an oxide, examples of the oxide include manganese oxide ($Mn_3O_4$), iron oxide ($Fe_2O_3$), cobalt oxide ($Co_3O_4$), nickel oxide (NiO), copper oxide (CuO), titanium oxide ($TiO_2$), zinc oxide (ZnO), aluminum oxide ($Al_2O_3$), lanthanum oxide ($La_2O_3$), praseodymium oxide ($Pr_6O_{11}$), neodymium oxide ($Nd_2O_3$), europium oxide ($Eu_2O_3$), gadolinium oxide ($Gd_2O_3$), terbium oxide ($Tb_2O_3$), dysprosium oxide ($Dy_2O_3$), holmium oxide ($Ho_2O_3$), erbium oxide ($Er_2O_3$) and ytterbium oxide ($Yb_2O_3$).

The zirconia crystal grains of the chromatic sintered body preferably have an average crystal grain size of 2 μm or less, more preferably 1 μm or less. For example, the zirconia crystal grains have an average crystal grain size of 0.5 μm or more.

The complex sintered body of the embodiment may be the same as the complex sintered body characterized in that the surface layer and the achromatic layer are laminated, except for the foregoing structure in which, for example, the base layer is the chromatic layer.

The complex sintered body of the embodiment can be used as a member including the complex sintered body and can be used for various members, such as members for scratchproof, high-quality jewelry and decorative members, for example, timepiece components and exterior components of portable electronic devices.

A member including the complex sintered body of the embodiment may include the complex sintered body of the embodiment in such a manner that at least the surface layer (red sintered body) can be visually recognized, and may include the complex sintered body of the embodiment in a form in which the surface layer and the base layer can be visually recognized.

A method for producing the complex sintered body of the embodiment will be described below.

The complex sintered body of the embodiment is formed by laminating the surface layer and the base layer using an arbitrary-selected method. The complex sintered body having a structure in which the surface layer and the base layer are laminated by sintering is preferably produced by a method for producing a complex sintered body, the method comprising:

a sintering step of sintering a green body in a reducing atmosphere, the green body including a layer (hereinafter, also referred to as a "red composition layer") containing 2% or more by mole and less than 6% by mole of yttria, 0.5% or more by mole and less than 4% by mole of an oxide of cerium in terms of $CeO_2$ and 0.1% or more by mass and less than 2% by mass of an oxide of aluminum, the balance being zirconia; and at least one of a layer containing 2% or more by mole and less than 6% by mole of yttria and 2.0% or more by mass and 20.0% or less by mass of an oxide of aluminum, the balance being zirconia and a layer containing 2% or more by mole and less than 6% by mole of yttria and a coloring agent, the balance being zirconia (hereinafter, the at least one of the layers is also referred to as a "base composition layer").

The composition of the red composition layer and the composition of the base composition layer may be arbitrary selected as long as the composition of the red composition layer and the composition of the base composition layer are the same as in the composition range of the red sintered body and the composition range of the base sintered body, respectively, as described above.

For example, the red composition layer preferably has a composition containing 2% or more by mole and 4% or less by mole of yttria, 0.5% or more by mole and 1.5% or less by mole of the oxide of cerium in terms of $CeO_2$ and 0.1% or more by mass and 1% or less by mass of the oxide of aluminum, the balance being zirconia.

The base composition layer formed of the layer containing 2% or more by mole and less than 6% by mole of yttria and 2.0% or more by mass and 20.0% or less by mass of the oxide of aluminum, the balance being zirconia (hereinafter, the base composition layer is also referred to as an "achromatic composition layer"), preferably has a composition containing 2% or more by mole and 4% or less by mole of yttria and 5.5% or more by mass and less than 20% by mass of the oxide of aluminum, the balance being zirconia; particularly preferably 2% or more by mole and 4% or less by mole of yttria and 5.5% or more by mass and 10% or less by mass of the oxide of aluminum, the balance being zirconia.

The base composition layer formed of the layer containing 2% or more by mole and less than 6% by mole of yttria and a coloring agent, the balance being zirconia (hereinafter, the base composition layer is also referred to as a "chromatic composition layer"), preferably has a composition containing 2% or more by mole and 4% or less by mole of yttria and, on an oxide basis, 0.1% or more by mass and 30% or less by mass of a compound containing one or more elements selected from the group consisting of manganese, iron, cobalt, nickel, copper, titanium, zinc, aluminum, lanthanum, praseodymium, neodymium, europium, gadolinium, terbium, dysprosium, holmium, erbium and ytterbium (hereinafter, also referred to as a "coloring raw material"), the balance being zirconia; more preferably 2% or more by mole and 4% or less by mole of yttria and, on an oxide basis, 0.1% or more by mass and 30% or less by mass of a compound containing one or more elements selected from the group consisting of iron, cobalt, nickel, titanium, aluminum and neodymium, the balance being zirconia.

The green body may have any shape. For example, the shape may be at least one selected from the group consisting of disk shapes, pillar shapes, plate-like shapes, spherical shapes, and substantially spherical shapes.

The red composition layer is produced by mixing raw material powders containing yttria, the oxide of cerium, the oxide of aluminum and zirconia so as to achieve the composition described above and forming the resulting mixture using arbitrary selected methods. The base composition layer is produced by mixing raw material powders containing yttria, the oxide of aluminum and zirconia so as to achieve the composition described above and forming the resulting mixture using arbitrary selected methods.

The raw material powder of zirconia is preferably an easily sinterable powder. Regarding the physical properties, the raw material powder of zirconia preferably has an yttria content of 2% or more by mole and less than 6% by mole, a BET specific surface area of 5 $m^2$/g or more and 20 $m^2$/g or less, more preferably 5 $m^2$/g or more and 17 $m^2$/g or less, and a purity of 99.6% or more, more preferably 99.8% or more.

The raw material powder of the oxide of cerium preferably has an average particle size of 3 μm or less, more preferably 2 μm or less, even more preferably 1 μm or less. A particularly preferable example of the raw material powder of the oxide of cerium is a cerium oxide powder, or a cerium oxide powder having a purity of 99% or more, or a cerium oxide powder having a purity of 99.9% or more.

The raw material powder of the oxide of aluminum is preferably a powder having at least one of a substantially spherical shape and a plate-like shape. In the case where the raw material powder of the oxide of aluminum has such a shape, the raw material powder of the oxide of aluminum is not aggregated and tends to be irregularly dispersed in the red composition layer. In the case where the raw material powder of the oxide of aluminum has a substantially spherical shape, the average particle size thereof is preferably 1 μm or less, more preferably 0.5 μm or less. In the case where the raw material powder of the oxide of aluminum has a plate-like shape, the thickness thereof is preferably 0.5 μm or less, more preferably 0.3 μm or less. Moreover, the ratio of the thickness to the long axis (thickness/long axis) is preferably 0.1 or less, more preferably 0.06 or less. An example of the raw material powder of the oxide of aluminum having a plate-like shaped is an aluminum oxide powder having a long axis of 1 μm or more and 3 μm or less and a thickness of 0.05 μm or more and 0.2 μm or less.

The coloring raw material may be a compound containing at least one coloring agent. For example, the coloring raw material may be one or more compounds, containing at least one coloring agent, selected from the group consisting of oxides, oxyhydroxides, hydroxides, sulfates, acetates, nitrates, halides and alkoxides. Preferably, the coloring raw material is one or more compounds, containing at least one coloring agent, selected from the group consisting of oxides, oxyhydroxides and hydroxides. In another embodiment, the coloring raw material is preferably one or more compounds selected from the group consisting of hydroxides, oxyhydroxides and oxides, the one or more compounds containing one or more elements selected from the group consisting of iron, cobalt, nickel, aluminum, neodymium, gadolinium and erbium. More preferably, the coloring raw material is one or more compounds selected from the group consisting of hydroxides, oxyhydroxides and oxides, the one or more compounds containing one or more elements selected from the group consisting of iron, cobalt, nickel, aluminum and neodymium.

The green body to be subjected to the sintering step is preferably produced by mixing these raw material powders to prepare mixed powders for the red composition layer and the base composition layer and forming the mixed powders into a lamination.

A method for mixing the raw material powders for each of the red composition layer and the base composition layer may be arbitrary selected as long as the raw material powders are sufficiently mixed to prepare a mixed powder. Preferred examples of the mixing method include wet mixing and a mixing method with at least one of a ball mill and a stirring mill. A method in which a slurry mixture containing the raw material powders and either water or alcohol is ground and mixed is more preferred.

A method for forming the mixed powders may be arbitrary selected as long as the mixed powders are formed into the red composition layer and the base composition layer. The method may be at least one selected from the group consisting of die pressing, cold isostatic pressing, slip casting and injection molding. At least one of die pressing and cold isostatic pressing is preferred.

Examples of a forming method include a method in which one of the mixed powders for the red composition layer and the base composition layer is charged into a die, then the other mixed powder is charged thereinto, and forming is performed; a method in which one of the mixed powders for the red composition layer and the base composition layer is charged into a die and formed into a green body, then the other mixed power is placed on the green body, and forming is performed. To flatten the surface of the mixed powder charged into the die, vibration may be applied, for example, by tapping after charging the powder and before forming.

In the sintering step, the green body is sintered in a reducing atmosphere. The sintering in the reducing atmosphere reduces the oxide of cerium in the red composition layer, allows sintering between the red composition layer and the base composition layer to proceed, and the densification of a complex sintered body to proceed. This provides a complex sintered body including a zirconia sintered body exhibiting a bright red color.

The sintering may be performed under conditions such that the formation of trivalent cerium proceeds in the oxide of cerium and such that the sintering between the red composition layer and the base composition layer proceeds. For example, the sintering is performed in the reducing atmosphere at 1,400° C. or higher and 1,600° C. or lower.

The sintering step is preferably a sintering step (hereinafter, also referred to as a "two-step sintering process") including a primary sintering step of subjecting a green body to pressureless sintering to produce a primary sintered body and a secondary sintering step of sintering the primary sintered body in a reducing atmosphere. The complex sintered body can be produced with high productivity, since densification is performed before the formation of trivalent cerium.

In an embodiment, the green body to be subjected to the sintering step is a green body including:
a layer containing 2% or more by mole and less than 6% by mole of yttria, 0.5% or more by mole and less than 4% by mole of an oxide of cerium in terms of $CeO_2$ and 0.1% or more by mass and less than 2% by mass of an oxide of aluminum, the balance being zirconia; and
a layer containing 2% or more by mole and less than 6% by mole of yttria and 2.0% or more by mass and 20.0% or less by mass of an oxide of aluminum, the balance being zirconia.

In another embodiment, the green body to be subjected to the sintering step is a green body including:
a layer containing 2% or more by mole and less than 6% by mole of yttria, 0.5% or more by mole and less than 4% by mole of an oxide of cerium in terms of $CeO_2$ and 0.1% or more by mass and less than 2% by mass of an oxide of aluminum, the balance being zirconia, and
a layer containing 2% or more by mole and less than 6% by mole of yttria and a coloring agent, the balance being zirconia.

The sintering in the secondary sintering step may be performed by hot isostatic pressing (HIP) treatment. A preferred example of the two-step sintering process is a sintering process (hereinafter, also referred to as a "pressureless reduction method") including a primary sintering step of subjecting a green body to pressureless sintering in an oxidizing atmosphere to produce a primary sintered body and a secondary sintering step of subjecting the primary sintered body to pressureless sintering in a reducing atmosphere.

In the pressureless reduction method, preferably, the sintered body is densified in the primary sintering step, and trivalent cerium is formed in the secondary sintering step. The pressureless sintering in the embodiment is a method of sintering without applying an external force during sintering.

The pressureless reduction method is suitable for industrial application because the sintered body of the embodiment can be produced with simpler equipment. In the pressureless reduction method, preferably, HIP treatment is not used.

In the primary sintering step in the pressureless reduction method, a green body is subjected to pressureless sintering in an oxidizing atmosphere. This provides a primary sintered body to be subjected to pressureless sintering in a reducing atmosphere (hereinafter, also referred to as "reduction pressureless sintering").

In the primary sintering step, the green body is preferably sintered under conditions such that the resulting primary sintered body has a relative density of 97% or more and the zirconia crystal grains in the red composition layer have an average crystal grain size of 2 μm or less. In the case of such a primary sintered body, the formation of trivalent cerium is easily promoted by the subsequent reduction pressureless sintering.

A primary sintered body having a higher relative density is more preferred. The relative density is preferably 97% or more, more preferably 99% or more, even more preferably 99.5% or more. The primary sintered body may have a relative density of 100% or less. The zirconia crystal grains in the red sintered body included in the primary sintered body preferably have an average crystal grain size of 2 μm or less, more preferably 1.5 μm or less, even more preferably 1 μm or less.

For example, the primary sintering step of producing a primary sintered body to be subjected to the reduction pressureless sintering may be performed under the conditions described below.

Primary sintering temperature: 1,425° C. or higher and 1,650° C. or lower, or
  1,450° C. or higher and 1,600° C. or lower
Sintering atmosphere: oxidizing atmosphere, or air atmosphere The primary sintering time depends on the primary sintering temperature. A primary sintering time of 1 hour or more and 10 hours or less results in a primary sintered body that can be suitably subjected to the secondary sintering step.

In the primary sintering, the rate of temperature increase from 1,000° C. to the primary sintering temperature is preferably 250° C./h or less, more preferably 200° C./h or less. When the rate of temperature increase at 1,000° C. or higher is 250° C./h or less, pores inside the red composition layer are easily eliminated. Even more preferably, the rate of temperature increase is, for example, 100° C./h or less, still even more preferably 50° C./h or less.

The rate of temperature decrease from the primary sintering temperature to 1,000° C. after holding at the primary sintering temperature is preferably 50° C./h or more, more preferably 100° C./h or more. When the rate of temperature decrease down to 1,000° C. is within this range, proceeding of sintering due to remaining heat does not easily occurred in the primary sintering step. Thereby, a crystal grain size tend to uniform.

In the secondary sintering step in the pressureless reduction method, sintering (pressureless reduction sintering) is performed under conditions such that the formation of trivalent cerium in the primary sintered body proceeds.

The sintering temperature is 1,350° C. or higher, more preferably 1,400° C. or higher. Trivalent cerium is easily formed at 1,350° C. or higher. The reduction of trivalent cerium proceeds sufficiently without excessive grain growth, when the sintering temperature is 1,600° C. or lower, or 1,550° C. or lower. The temperature of the sintering (reduction pressureless sintering) in the secondary sintering step in the pressureless reduction method may be lower than or equal to the primary sintering temperature, mainly to form trivalent cerium.

The sintering time in the secondary sintering step may be the time needed to form trivalent cerium. For example, the sintering time is 1 hour or more and 10 hours or less.

The sintering of the secondary sintering step in the pressureless reduction method is performed in a reducing atmosphere, thereby forming trivalent cerium. Examples of the reducing atmosphere include hydrogen-containing atmospheres and carbon monoxide-containing atmospheres. The reducing atmosphere is preferably a nitrogen atmosphere containing at least one of hydrogen and carbon monoxide, or an argon atmosphere containing at least one of hydrogen and carbon monoxide. The reducing atmosphere is more preferably a hydrogen-containing nitrogen atmosphere or a hydrogen-containing argon atmosphere. The hydrogen content or the carbon monoxide content of any of these preferable reducing atmospheres may be arbitrary selected as long as a reducing atmosphere in which the formation of trivalent cerium proceeds is obtained. For example, the hydrogen content or the carbon monoxide content may be 1% or more by volume and 10% or less by volume.

Preferably, the production method of the embodiment does not include a step of subjecting the resulting complex sintered body to heat treatment in an oxidizing atmosphere after the sintering step. In the production method of the embodiment, sintering is performed in a reducing atmosphere to form trivalent cerium. In the sintering of a zirconia sintered body in a reducing atmosphere, the red sintered body may be tinged with black due to the reduction of zirconia. The blackish tinge is usually eliminated by performing sintering in an oxidizing atmosphere after sintering in the reducing atmosphere, that is, by performing what is called annealing treatment. However, the complex sintered body produced by the production method of the embodiment exhibits a bright red color owing to trivalent cerium. If annealing treatment is performed, trivalent cerium is oxidized together with zirconia. This changes trivalent cerium to tetravalent cerium. As a result, the sintered body that has been subjected to annealing treatment cannot exhibit a bright red color.

To obtain a desired color of the complex sintered body, the production method of the embodiment may include a step of processing the red sintered body.

EXAMPLES

While the embodiments will be specifically described below by examples, the embodiments are not limited to these examples.

Methods for measuring characteristics of powders and sintered bodies of the embodiments will be described below. (Measurement of Color and Reflectance)

The color of a sintered body sample was measured by a method according to JIS Z 8722. A typical colorimeter (device name: CM-700d, available from Konica Minolta, Inc.) was used for the measurement. The sintered body sample was placed on the specimen measuring port of the colorimeter and subjected to measurement under measurement conditions described below. Regarding the measurement method, the color and reflectance were determined in SCE mode in which specularly reflected light was excluded and diffusely reflected light was measured.

Illuminant: Illuminant D65
Observer angle: 10°
Standard sample: white calibration cap (product name: CM-A177, available from Konica Minolta, Inc.)

The sintered body sample used was a sintered body with both surfaces that had been mirror-polished to a surface roughness Ra of 0.02 μm or less.

The reflectance and the reflectance ratio were determined from the percentage of the luminous flux of diffusely reflected light based on the luminous flux of incident light at a wavelength of 580 nm or 650 nm.

(Crystal Structure)

The crystal structure of the sintered body sample was determined from an XRD pattern. Regarding the XRD pattern, the XRD pattern of a powder sample was obtained with a typical X-ray diffractometer (device name: Ultima IV, available from Rigaku Corporation). The XRD measurement conditions are described below.

Radiation source: CuKα radiation (2=0.15418 nm)

Measurement mode: continuous scan

Scan rate: 4°/min

Step size: 0.02°Measurement range: $2\theta=26°$ to 33°

The crystal structure of the sintered body sample was identified from the resulting XRD pattern.

(Average Crystal Grain Size)

The average crystal grain size of zirconia crystal grains in the red sintered body of a surface layer was measured by an intercept method. A sintered body was mirror-polished and thermally etched. The surface layer thereof was observed at a magnification of ×20,000 with a scanning electron microscope. The average grain size of the zirconia crystal grains was measured from the resulting SEM observation image by the intercept method (k=1.78). The number of zirconia crystal grains measured was 200 or more (225±25) zirconia crystal grains.

Synthesis Example 1

193.8 g of a zirconia powder containing 3% by mole of yttria, 6.0 g of a cerium oxide powder having an average particle size of 0.8 μm, 0.2 g of a substantially spherical aluminum oxide powder having an average particle size of 0.3 μm and deionized water were mixed to prepare a slurry. The slurry was mixed and ground for 24 hours with a ball mill using zirconia balls 10 mm in diameter to prepare a mixed powder.

The mixed powder was dried in air at 110° C. and then collected a powder having an aggregate size of 180 μm or less, by sieving. The resulting powder was used as a red powder.

186.0 g of a zirconia powder containing 3% by mole of yttria, 14.0 g of a substantially spherical aluminum oxide powder having an average particle size of 0.3 μm and deionized water were mixed to prepare a slurry. The slurry was mixed and ground for 24 hours with a ball mill using zirconia balls 10 mm in diameter to prepare a mixed powder.

The mixed powder was dried in air at 110° C. and then collected a powder having an aggregate size of 180 μm or less, by sieving. The resulting powder was used as a base powder.

The base powder was charged into a metal die having a diameter of 25 mm and then subjected to uniaxial pressing at a pressure of 100 MPa to form a disk-shaped green body. The red powder was placed on the green body and subjected to uniaxial pressing at a pressure of 100 MPa to form a disk-shaped green body including a layer composed of the base powder and a layer composed of the red powder. The disk-shaped green body has a diameter of 25 mm and a thickness of 5.0 mm. The observation of the green body in the thickness direction revealed that an interface was present between the layer composed of the base powder and the layer composed of the red powder. The thickness of each of the layer composed of the base powder and the layer composed of the red powder was measured, from the interface, using a digital microscope (device name: VHX-5000, Keyence Corporation) and found to be 2.5 mm (thickness of base layer/thickness of surface layer=1.0).

The resulting green body was subjected to primary sintering by pressureless sintering in an air atmosphere at 1,550° C. for 2 hours to provide a primary sintered body. In the primary sintering, the rate of temperature increase was 100° C./h, and the rate of temperature decrease was 200° C./h.

The resulting primary sintered body was sintered by pressureless sintering in an argon atmosphere containing 5% hydrogen at 1,480° C. for 1 hour. Then, a disk-shaped complex sintered body having a diameter of 20 mm and a thickness of 4.0 mm, the complex sintered body including a lamination of a layer composed of a zirconia sintered body containing 2.2% by mole of ceria in terms of $CeO_2$, 3% by mole of yttria and 0.1% by mass of alumina, the balance being zirconia, the ceria containing trivalent cerium; and a layer composed of a zirconia-based sintered body containing 7.0% by mass of alumina, the balance being zirconia containing 3% by mole of yttria was obtained. The observation of the sintered body in the thickness direction revealed that an interface was present between the surface layer and the base layer. One reason for the formation of such an interface is seemingly the sintering of the green body formed by the method in which the base composition layer was formed into the green body, the red mixed powder was placed thereon, and forming was performed. However, such an interface is seemingly obtained also by performing forming after the mixed powder for a red composition layer was charged without forming the base composition layer. No gap was present at the interface between the red sintered body and the base sintered body of the complex sintered body. No color bleeding was visually observed at the interface. The zirconia crystal grains in the red sintered body of the surface layer had an average crystal grain size of 0.65 μm. The crystal structure of each of the surface layer and the base layer was a mixed phase of a tetragonal and a cubic.

A zirconia-based sintered body containing 7.0% by mass of alumina, the balance being zirconia containing 3% by mole of yttria, was produced in the same way as above, except that only the base powder was used. The reflectance (650) of the zirconia-based sintered body was 84.8%. The color of the base sintered body had a lightness L* of 93.5, a hue a* of −0.2 and a hue b* of 1.0.

Comparative Synthesis Example 1

193.8 g of a zirconia powder containing 3% by mole of yttria, 6.0 g of a cerium oxide powder having an average particle size of 0.8 μm, 0.2 g of a substantially spherical aluminum oxide powder having an average particle size of 0.3 μm and deionized water were mixed to prepare a slurry. The slurry was mixed and ground for 24 hours with a ball mill using zirconia balls 10 mm in diameter to prepare a mixed powder.

The mixed powder was dried in air at 110° C. and then collected a powder having an aggregate size of 180 μm or less, by sieving. The resulting powder was used as a red powder.

The red powder was charged into a metal die having a diameter of 25 mm and then subjected to uniaxial pressing at a pressure of 100 MPa to form a disk-shaped green body having a diameter of 25 mm and a thickness of 2.5 mm.

The resulting green body was subjected to primary sintering by pressureless sintering in an air atmosphere at 1,550° C. for 2 hours to provide a primary sintered body. In the primary sintering, the rate of temperature increase was 100° C./h, and the rate of temperature decrease was 200° C./h.

The resulting primary sintered body was sintered by pressureless sintering in an argon atmosphere containing 5% hydrogen at 1,480° C. for 1 hour to provide a red sintered body composed of a zirconia sintered body containing 2.2% by mole of an oxide of cerium in terms of $CeO_2$, 3% by mole of yttria and 0.1% by mass of alumina, the balance being zirconia, the oxide of cerium containing trivalent cerium. The reflectance (650) of the resulting red sintered body was 42.8%.

Example 1

The surface layer (red sintered body) of the complex sintered body obtained in Synthesis example 1 was ground with a grinding machine (device name: Technolap Step Auto MG-335, available from Maruto Instrument Co., Ltd). Thereby, a complex sintered body having a surface layer with a thickness of 0.3 mm and a base layer with a thickness of 2.0 mm was obtained (thickness of base layer/thickness of surface layer=6.7).

Example 2

A complex sintered body was produced in the same manner as in Example 1, except that the layer composed of the red sintered body in the complex sintered body had a thickness of 0.4 mm. Thereby, a complex sintered body having a surface layer with a thickness of 0.4 mm and a base layer with a thickness of 2.0 mm was obtained (thickness of base layer/thickness of surface layer=5.0).

Comparative Example 1

A sintered body of this comparative example was produced in the same manner as in Example 1, except that the red sintered body produced in Comparative synthesis example 1 was used and the red sintered body was ground to a thickness of 0.2 mm.

Comparative Example 2

A sintered body of this comparative example was produced in the same manner as in Comparative example 1, except that the red sintered body was ground to a thickness of 0.4 mm.

The results of these examples and comparative examples are presented in a table below.

TABLE 1

| | Thickness of surface layer (red sintered body) (mm) | Color of surface layer (red sintered body) | | | |
| --- | --- | --- | --- | --- | --- |
| | | L* | a* | b* | a/b* |
| Example 1 | 0.3 | 29.8 | 46.7 | 36.4 | 1.3 |
| Example 2 | 0.4 | 25.5 | 41.5 | 29.3 | 1.4 |
| Comparative example 1 | 0.2 | 25.7 | 40.3 | 36.3 | 1.1 |
| Comparative example 2 | 0.4 | 23.5 | 40.7 | 32.4 | 1.3 |

These results indicated that in both of Examples 1 and 2, a bright red color was exhibited and that an about 0.1-mm difference in thickness between the sintered bodies resulted in different colors. A difference in color between Examples 1 and 2, i.e., $\Delta E$ ($=(\Delta L^{*2}+\Delta a^{*2}+\Delta b^{*2})^{0.5}$), is 9.8. The red color of the sintered bodies was finely adjusted to the extent that a difference in color could be visually perceived. The values of L*, a* and b* were reduced, which indicates that the color was adjusted in the direction in which the chroma was reduced, when the ratio of the thickness of the base layer to the thickness of the surface layer was reduced. It was found that in both of Comparative examples 1 and 2, although a bright red color was exhibited, a 0.2-mm difference in thickness between the sintered bodies resulted in almost no change in visually perceived color. The difference $\Delta E$ in color between Comparative examples 1 and 2 was 4.5. These results indicate that in the case of the complex sintered body, the color can be changed by simply changing the thickness of the surface layer (red sintered body) without changing the composition while a bright red color is exhibited, in other words, the visually perceived color of the surface layer can be finely adjusted after sintering.

Example 3

(Production of Red Sintered Body)

A red powder was produced in the same manner as in Synthesis example 1, except that a slurry prepared by mixing 196.8 g of a zirconia powder containing 3% by mole of yttria, 2.0 g of a cerium oxide powder having an average particle size of 0.8 μm, 1.2 g of a substantially spherical aluminum oxide powder having an average particle size of 0.3 μm and deionized water was used.

The red powder was charged into a metal die having a diameter of 25 mm and then subjected to uniaxial pressing at a pressure of 100 MPa to form a disk-shaped green body having a diameter of 25 mm and a thickness of 2.5 mm.

The resulting green body was subjected to primary sintering by pressureless sintering in an air atmosphere at 1,550° C. for 2 hours to provide a primary sintered body. In the primary sintering, the rate of temperature increase was 100° C./h, and the rate of temperature decrease was 200° C./h.

The resulting primary sintered body was sintered by pressureless sintering in an argon atmosphere containing 5% hydrogen at 1,400° C. for 1 hour to provide a red sintered body composed of a zirconia sintered body containing 0.7% by mole of an oxide of cerium in terms of $CeO_2$, 3% by mole of yttria and 0.6% by mass of alumina, the balance being zirconia, the oxide of cerium containing trivalent cerium. The crystal structure of the red sintered body was a mixed phase of a tetragonal and a cubic.

(Production of Achromatic Sintered Body)

A base powder was produced in the same manner as in Synthesis example 1, except that a slurry prepared by mixing 180.0 g of a zirconia powder containing 3% by mole of yttria, 20.0 g of a substantially spherical aluminum oxide powder having an average particle size of 0.3 μm and deionized water was used.

The base powder was charged into a metal die having a diameter of 25 mm and then subjected to uniaxial pressing at a pressure of 100 MPa to form a disk-shaped green body having a diameter of 25 mm and a thickness of 2.5 mm.

The resulting green body was sintered by pressureless sintering in an air atmosphere at 1,550° C. for 2 hours to provide an achromatic sintered body. In the sintering, the rate of temperature increase was 100° C./h, and the rate of temperature decrease was 200° C./h. The crystal structure of the achromatic sintered body was a mixed phase of a tetragonal and a cubic.

(Production of Complex Sintered Body)

The red sintered body and the achromatic sintered body were laminated to produce a disk-shaped complex sintered body having a diameter of 20 mm and a thickness of 4.0 mm, the complex sintered body including a lamination of a layer composed of a zirconia sintered body containing 0.7% by mole of ceria in terms of $CeO_2$, 3% by mole of yttria and 0.6% by mass of alumina, the balance being zirconia, the ceria containing trivalent cerium; and a layer composed of a zirconia-based sintered body containing 10.0% by mass of alumina, the balance being zirconia containing 3% by mole of yttria.

The surface layer of the resulting complex sintered body was ground with a grinding machine to produce a complex sintered body having a surface layer with a thickness of 0.2 mm and a base layer with a thickness of 2.5 mm (thickness of base layer/thickness of surface layer=5.0).

Example 4

A complex sintered body was produced in the same manner as in Example 3. The surface layer was ground to produce a complex sintered body having a surface layer with a thickness of 0.4 mm and a base layer with a thickness of 2.5 mm (thickness of base layer/thickness of surface layer=6.3).

The results are presented in a table below.

TABLE 2

| | Thickness of surface layer (red sintered body) (mm) | Color of surface layer (red sintered body) | | | |
|---|---|---|---|---|---|
| | | L* | a* | b* | a*/b* |
| Example 3 | 0.2 | 40.1 | 55.7 | 60.8 | 0.9 |
| Example 4 | 0.4 | 33.0 | 52.3 | 48.8 | 1.1 |

A difference ΔE in color between Examples 3 and 4 is 14.4 at a 0.2-mm difference in thickness. The results indicated that a change in the thickness of the surface layer enables fine adjustment of the visually perceived red color.

Example 5

(Production of Red Sintered Body)

A red powder was produced in the same manner as in Synthesis example 1, except that a slurry prepared by mixing 196.8 g of a zirconia powder containing 3% by mole of yttria, 2.0 g of a cerium oxide powder having an average particle size of 0.8 μm, 1.2 g of a substantially spherical aluminum oxide powder having an average particle size of 0.3 μm and deionized water was used.

The red powder was charged into a metal die having a diameter of 25 mm and then subjected to uniaxial pressing at a pressure of 100 MPa to form a disk-shaped green body having a diameter of 25 mm and a thickness of 2.5 mm.

The resulting green body was subjected to primary sintering by pressureless sintering in an air atmosphere at 1,550° C. for 2 hours to provide a primary sintered body. In the primary sintering, the rate of temperature increase was 100° C./h, and the rate of temperature decrease was 200° C./h.

The resulting primary sintered body was sintered by pressureless sintering in an argon atmosphere containing 5% hydrogen at 1,400° C. for 1 hour. Then, a red sintered body composed of a zirconia sintered body containing 0.7% by mole of an oxide of cerium in terms of $CeO_2$, 3% by mole of yttria and 0.1% by mass of alumina, the balance being zirconia, the oxide of cerium containing trivalent cerium is obtained. The resulting red sintered body had an average crystal grain size of 0.64 μm. The crystal structure thereof was a mixed phase of a tetragonal and a cubic.

(Production of Chromatic Sintered Body)

A base powder was produced in the same manner as in Synthesis example 1, except that a slurry prepared by mixing 188.9 g of a zirconia powder containing 3% by mole of yttria, 0.6 g of a cobalt oxide powder, 10 g of a titanium oxide powder, 0.5 g of an aluminum oxide powder and deionized water was used.

The base powder was charged into a metal die having a diameter of 25 mm and then subjected to uniaxial pressing at a pressure of 100 MPa to form a disk-shaped green body having a diameter of 25 mm and a thickness of 2.5 mm.

The resulting green body was sintered by pressureless sintering in an air atmosphere at 1,550° C. for 2 hours to provide a chromatic sintered body. In the sintering, the rate of temperature increase was 100° C./h, and the rate of temperature decrease was 200° C./h. The crystal structure of the chromatic sintered body was a mixed phase of a tetragonal and a cubic.

(Production of Complex Sintered Body)

The red sintered body and the chromatic sintered body were laminated to produce a disk-shaped complex sintered body having a diameter of 20 mm and a thickness of 4.0 mm, the complex sintered body including a lamination of a layer composed of a zirconia sintered body containing 0.7% by mole of ceria in terms of $CeO_2$, 3% by mole of yttria and 0.6% by mass of alumina, the balance being zirconia, the ceria containing trivalent cerium; and a layer composed of a zirconia-based sintered body containing 0.3% by mass of cobalt, 5.0% by mass of titania and 0.25% by mass of alumina, the balance being zirconia containing 3% by mole of yttria. The base layer had a reflectance ratio of 1.23.

The surface layer of the resulting complex sintered body was ground with a grinding machine to produce a complex sintered body having a surface layer with a thickness of 0.3 mm and a base layer with a thickness of 2.5 mm (thickness of base layer/thickness of surface layer=8.3).

Example 6

(Production of Red Sintered Body)

A red sintered body was produced in the same manner as in Example 5.

(Production of Chromatic Sintered Body)

A base powder was produced in the same manner as in Synthesis example 1, except that a slurry prepared by mixing 158.9 g of a zirconia powder containing 3% by mole of yttria, 1.0 g of a nickel oxide powder, 0.1 g of a cobalt aluminate powder, 40 g of an aluminum oxide powder and deionized water was used.

The base powder was charged into a metal die having a diameter of 25 mm and then subjected to uniaxial pressing at a pressure of 100 MPa to form a disk-shaped green body having a diameter of 25 mm and a thickness of 2.5 mm.

The resulting green body was sintered in the same manner as in Example 5 to provide a chromatic sintered body. The crystal structure of the chromatic sintered body was a mixed phase of a tetragonal and a cubic.

(Production of Complex Sintered Body)

The red sintered body and the chromatic sintered body were laminated to produce a disk-shaped complex sintered body having a diameter of 20 mm and a thickness of 4.0 mm, the complex sintered body including a lamination of a layer composed of a zirconia sintered body containing 0.7% by mole of ceria in terms of $CeO_2$, 3% by mole of yttria and 0.6% by mass of alumina, the balance being zirconia, the ceria containing trivalent cerium; and a layer composed of a zirconia-based sintered body containing 0.5% by mass of nickel, 6.7% by mass of cobalt aluminate as the cobalt content and 20% by mass of alumina, the balance being zirconia containing 3% by mole of yttria. The base layer had a reflectance ratio of 0.98.

The surface layer of the resulting complex sintered body was ground with a grinding machine to produce a complex sintered body having a surface layer with a thickness of 0.3 mm and a base layer with a thickness of 2.5 mm (thickness of base layer/thickness of surface layer=8.3).

Example 7

(Production of Red Sintered Body)

A red sintered body was produced in the same manner as in Example 5.

(Production of Chromatic Sintered Body)

A base powder was produced in the same manner as in Synthesis example 1, except that a slurry prepared by mixing 192.0 g of a zirconia powder containing 3% by mole of yttria, 4.0 g of a neodymium oxide powder, 4.0 g of an aluminum oxide powder and deionized water was used.

The base powder was charged into a metal die having a diameter of 25 mm and then subjected to uniaxial pressing at a pressure of 100 MPa to form a disk-shaped green body having a diameter of 25 mm and a thickness of 2.5 mm.

The resulting green body was sintered in the same manner as in Example 5 to provide a sintered body. The crystal structure of the chromatic sintered body was a mixed phase of a tetragonal and a cubic.

(Production of Complex Sintered Body)

The red sintered body and the chromatic sintered body were laminated to produce a disk-shaped complex sintered body having a diameter of 20 mm and a thickness of 4.0 mm, the complex sintered body including a lamination of a layer composed of a zirconia sintered body containing 0.7% by mole of ceria in terms of $CeO_2$, 3% by mole of yttria and 0.6% by mass of alumina, the balance being zirconia, the ceria containing trivalent cerium, and a layer composed of a zirconia-based sintered body containing 2.0% by mass of neodymium and 2% by mass of alumina, the balance being zirconia containing 3% by mole of yttria. The base layer had a reflectance ratio of 1.98.

The surface layer of the resulting complex sintered body was ground with a grinding machine to produce a complex sintered body having a surface layer with a thickness of 0.3 mm and a base layer with a thickness of 2.5 mm (thickness of base layer/thickness of surface layer=8.3).

Example 8

(Production of Red Sintered Body)

A red sintered body was produced in the same manner as in Example 5.

(Production of Chromatic Sintered Body)

A base powder was produced in the same manner as in Synthesis example 1, except that a slurry prepared by mixing 185.0 g of a zirconia powder containing 3% by mole of yttria, 5.0 g of iron oxide, 0.02 g of a manganese powder, 10 g of an aluminum oxide powder and deionized water was used.

The base powder was charged into a metal die having a diameter of 25 mm and then subjected to uniaxial pressing at a pressure of 100 MPa to form a disk-shaped green body having a diameter of 25 mm and a thickness of 2.5 mm.

The resulting green body was subjected to primary sintering by pressureless sintering in an air atmosphere at 1,550° C. for 2 hours to provide a primary sintered body. In the primary sintering, the rate of temperature increase was 100° C./h, and the rate of temperature decrease was 200° C./h.

(Production of Complex Sintered Body)

The red sintered body and the chromatic sintered body were laminated to produce a disk-shaped complex sintered body having a diameter of 20 mm and a thickness of 4.0 mm, the complex sintered body including a lamination of a layer composed of a zirconia sintered body containing 0.7% by mole of ceria in terms of $CeO_2$, 3% by mole of yttria and 0.6% by mass of alumina, the balance being zirconia, the ceria containing trivalent cerium; and a layer composed of a zirconia-based sintered body containing 2.5% by mass of iron, 0.01% by mass of manganese and 5% by mass of alumina, the balance being zirconia containing 3% by mole of yttria. The base layer had a reflectance ratio of 1.28.

The surface layer of the resulting complex sintered body was ground with a grinding machine to produce a complex sintered body having a surface layer with a thickness of 0.3 mm and a base layer with a thickness of 2.5 mm (thickness of base layer/thickness of surface layer=8.3).

Example 9

(Production of Red Sintered Body)

A red sintered body was produced in the same manner as in Example 5.

(Production of Chromatic Sintered Body)

A base powder was produced in the same manner as in Synthesis example 1, except that a slurry prepared by mixing 186.0 g of a zirconia powder containing 3% by mole of yttria, 14.0 g of a nickel oxide powder and deionized water was used.

The base powder was charged into a metal die having a diameter of 25 mm and then subjected to uniaxial pressing at a pressure of 100 MPa to form a disk-shaped green body having a diameter of 25 mm and a thickness of 2.5 mm.

The resulting green body was sintered in the same manner as in Example 5 to provide a chromatic sintered body. The crystal structure of the chromatic sintered body was a mixed phase of a tetragonal and a cubic.

(Production of Complex Sintered Body)

The red sintered body and the chromatic sintered body were laminated to produce a disk-shaped complex sintered body having a diameter of 20 mm and a thickness of 4.0 mm, the complex sintered body including a lamination of a layer composed of a zirconia sintered body containing 0.7% by mole of ceria in terms of $CeO_2$, 3% by mole of yttria and 0.6% by mass of alumina, the balance being zirconia, the ceria containing trivalent cerium; and a layer composed of a zirconia-based sintered body containing 7.0% by mass of nickel, the balance being zirconia containing 3% by mole of yttria. The base layer had a reflectance ratio of 0.82.

The surface layer of the resulting complex sintered body was ground with a grinding machine to produce a complex sintered body having a surface layer with a thickness of 0.3 mm and a base layer with a thickness of 2.5 mm (thickness of base layer/thickness of surface layer=8.3).

Comparative Example 3

(Production of Red Sintered Body)

A red sintered body was produced in the same manner as in Example 5.

(Production of Chromatic Sintered Body)

A base powder was produced in the same manner as in Synthesis example 1, except that a slurry prepared by mixing 197.5 g of a zirconia powder containing 3% by mole of yttria, 2.0 g of a praseodymium oxide powder, 0.5 g of an aluminum oxide powder and deionized water was used.

The base powder was charged into a metal die having a diameter of 25 mm and then subjected to uniaxial pressing at a pressure of 100 MPa to form a disk-shaped green body having a diameter of 25 mm and a thickness of 2.5 mm.

The resulting green body was sintered in the same manner as in Example 5 to provide a chromatic sintered body.

(Production of Complex Sintered Body)

The red sintered body and the chromatic sintered body were laminated to produce a disk-shaped complex sintered body having a diameter of 20 mm and a thickness of 4.0 mm, the complex sintered body including a lamination of a layer composed of a zirconia sintered body containing 0.7% by mole of ceria in terms of $CeO_2$, 3% by mole of yttria and 0.6% by mass of alumina, the balance being zirconia, the ceria containing trivalent cerium; and a layer composed of a zirconia-based sintered body containing 1.0% by mass of praseodymium and 0.25% by mass of alumina, the balance being zirconia containing 3% by mole of yttria.

The surface layer of the resulting complex sintered body was ground with a grinding machine to produce a complex sintered body having a surface layer with a thickness of 0.3 mm and a base layer with a thickness of 2.5 mm (thickness of base layer/thickness of surface layer=8.3).

Comparative Example 4

(Production of Red Sintered Body)

A red sintered body was produced in the same manner as in Example 5.

(Production of Achromatic Sintered Body)

A base powder was produced in the same manner as in Synthesis example 1, except that a slurry prepared by mixing 199.5 g of a zirconia powder containing 3% by mole of yttria, 0.5 g of an aluminum oxide powder and deionized water was used.

The base powder was charged into a metal die having a diameter of 25 mm and then subjected to uniaxial pressing at a pressure of 100 MPa to form a disk-shaped green body having a diameter of 25 mm and a thickness of 2.5 mm.

The resulting green body was sintered in the same manner as in Example 5 to provide a sintered body.

(Production of Complex Sintered Body)

The red sintered body and the chromatic sintered body were laminated to produce a disk-shaped complex sintered body having a diameter of 20 mm and a thickness of 4.0 mm, the complex sintered body including a lamination of a layer composed of a zirconia sintered body containing 0.7% by mole of ceria in terms of $CeO_2$, 3% by mole of yttria and 0.6% by mass of alumina, the balance being zirconia, the ceria containing trivalent cerium, and a layer composed of a zirconia-based sintered body containing 0.25% by mass of alumina, the balance being zirconia containing 3% by mole of yttria.

The surface layer of the resulting complex sintered body was ground with a grinding machine to produce a complex sintered body having a surface layer with a thickness of 0.3 mm and a base layer with a thickness of 2.5 mm (thickness of base layer/thickness of surface layer=8.3).

Comparative Example 5

(Production of Red Sintered Body)

A red sintered body was produced in the same manner as in Example 5.

(Production of Chromatic Sintered Body)

A base powder was produced in the same manner as in Synthesis example 1, except that a slurry prepared by mixing 159.4 g of a zirconia powder containing 3% by mole of yttria, 0.6 g of a cobalt aluminate powder, 40 g of an aluminum oxide powder and deionized water was used.

The base powder was charged into a metal die having a diameter of 25 mm and then subjected to uniaxial pressing at a pressure of 100 MPa to form a disk-shaped green body having a diameter of 25 mm and a thickness of 2.5 mm.

The resulting green body was sintered in the same manner as in Example 5 to provide a sintered body.

(Production of Complex Sintered Body)

The red sintered body and the chromatic sintered body were laminated to produce a disk-shaped complex sintered body having a diameter of 20 mm and a thickness of 4.0 mm, the complex sintered body including a lamination of a layer composed of a zirconia sintered body containing 0.7% by mole of ceria in terms of $CeO_2$, 3% by mole of yttria and 0.6% by mass of alumina, the balance being zirconia, the ceria containing trivalent cerium; and a layer composed of a zirconia-based sintered body containing 0.05% by mass of cobalt aluminate and alumina, the cobalt content being 0.01% by mass, the alumina content being 20.01% by mass, the balance being zirconia containing 3% by mole of yttria.

The surface layer of the resulting complex sintered body was ground with a grinding machine to produce a complex sintered body having a surface layer with a thickness of 0.3 mm and a base layer with a thickness of 2.5 mm (thickness of base layer/thickness of surface layer=8.3).

The results of the examples and the comparative examples described above are presented in a table below.

TABLE 3

| | Color of surface layer (red sintered body) | | | | Color of chromatic layer | | | |
| --- | --- | --- | --- | --- | --- | --- | --- | --- |
| | L* | a* | b* | a*-b* | L* | a* | b* | C* |
| Example 5 | 30.1 | 43.4 | 42.8 | 0.6 | 36.9 | 3.2 | −3.7 | 4.9 |
| Example 6 | 32.2 | 46.1 | 44.6 | 1.5 | 73.8 | −16.0 | −8.8 | 18.3 |
| Example 7 | 33.9 | 51.9 | 50.0 | 1.9 | 72.9 | 6.9 | −13.3 | 15.0 |
| Example 8 | 28.9 | 41.6 | 41.0 | 0.6 | 35.4 | 14.1 | 16.9 | 22.0 |
| Example 9 | 28.0 | 39.0 | 38.1 | 0.9 | 33.6 | −12.6 | 12.5 | 17.7 |

TABLE 3-continued

| | Color of surface layer (red sintered body) | | | | Color of chromatic layer | | | |
| | L* | a* | b* | a*-b* | L* | a* | b* | C* |
|---|---|---|---|---|---|---|---|---|
| Comparative example 3 | 34.3 | 51.9 | 51.7 | 0.2 | 71.4 | 15.3 | 45.7 | 48.1 |
| Comparative example 4 | 35.9 | 53.5 | 53.6 | 0.1 | 89.0 | −0.6 | 3.1 | 3.2 |
| Comparative example 5 | 33.1 | 49.0 | 48.9 | 0.1 | 74.2 | 0.8 | −2.6 | 2.7 |

The visually perceived colors of the surface layers of the complex sintered bodies of the examples were more intense red colors than the colors of the surface layers of the complex sintered bodies of the comparative examples. In the examples, (a*−b*) was 0.6 or more, whereas in the comparative examples, (a*−b*) was 0.2 or less. The differences in hue in the examples were greater than those in the comparative examples. Moreover, (a*−b*) of the single red sintered body was −1.4; thus, Δ(a*−b*) in the examples was 2.0 or more and 3.3 or less. In each of Examples 6 and 7, Δ(a*−b*) was 2.9 or more and 3.3 or less, and the visually perceived color of the surface layer was a particularly intense red color, compared with the single red sintered body.

Example 10

A red powder was produced in the same manner as in Synthesis example 1, except that a slurry prepared by mixing 196.8 g of a zirconia powder containing 3% by mole of yttria, 2.0 g of a cerium oxide powder having an average The resulting green body was subjected to primary sintering by pressureless sintering in an air atmosphere at 1,550° C. for 2 hours to provide a primary sintered body. In the primary sintering, the rate of temperature increase was 100° C./h, and the rate of temperature decrease was 200° C./h.

The resulting primary sintered body was sintered by pressureless sintering in an argon atmosphere containing 5, hydrogen at 1,400° C. for 1 hour to produce a disk-shaped complex sintered body having a diameter of 20 mm and a thickness of 4.0 mm, the complex sintered body including a lamination of a layer composed of a zirconia sintered body containing 2.2% by mole of ceria in terms of $CeO_2$, 3% by mole of yttria and 0.1% by mass of alumina, the balance being zirconia, the ceria containing trivalent cerium, and a layer composed of a zirconia-based sintered body containing 2.0% by mass of neodymium and 2% by mass of alumina, the balance being zirconia containing 3% by mole of yttria.

The results are presented in a table below.

TABLE 4

| | Color of surface layer (red sintered body | | | | Color of chromatic layer | | | |
| | L* | a* | b* | a*-b* | L* | a* | b* | C* |
|---|---|---|---|---|---|---|---|---|
| Example 7 | 33.9 | 51.9 | 50.0 | 1.9 | 72.9 | 6.9 | −13.3 | 15.0 |
| Example 10 | 34.0 | 52.2 | 49.9 | 2.3 | 73.0 | 6.9 | −13.2 | 14.9 | particle size of 0.8 μm, 1.2 g of a substantially spherical aluminum oxide powder having an average particle size of 0.3 μm and deionized water was used.

A base powder was produced in the same manner as in Synthesis example 1, except that a slurry prepared by mixing 192.0 g of a zirconia powder containing 3% by mole of yttria, 4.0 g of a neodymium oxide powder, 4.0 g of an aluminum oxide powder and deionized water was used.

The base powder was charged into a metal die having a diameter of 25 mm and then subjected to uniaxial pressing at a pressure of 100 MPa to form a disk-shaped green body. The red powder was placed on the green body and subjected to uniaxial pressing at a pressure of 100 MPa to form a disk-shaped green body including a layer composed of the base powder and a layer composed of the red powder, the disk-shaped green body having a diameter of 25 mm and a thickness of 5.0 mm. The observation of the green body in the thickness direction revealed that an interface was present between the layer composed of the base powder and the layer composed of the red powder. The thickness of each of the layer composed of the base powder and the layer composed of the red powder was measured from the interface using a digital microscope (device name: VHX-5000, Keyence Corporation) and found to be 2.5 mm (thickness of base layer/thickness of surface layer=1.0).

In Example 7, in which the red sintered body and the chromatic sintered body were laminated, and Example 10, in which the red sintered body and the chromatic sintered body were laminated by sintering, the difference ΔE in color of each of the surface layers was 0.3, and the difference ΔE in color of each of the chromatic layers was 0.1. The values were identical in both examples. From these results, the complex sintered bodies produced by both methods seemingly have the same effect on the visually perceived color because of the structure in which the surface layer and the chromatic layer are laminated. A comparison of Examples 7 and 10 indicates that in the case of the structure in which the red sintered body and the chromatic sintered body are laminated by sintering, a*−b* is increased.

The entire content of the specification, claims and abstract of Japanese Patent Application No. 2018-153790 filed on Aug. 20, 2018 is incorporated herein by reference as a disclosure of the specification of the present invention.

The invention claimed is:
1. A complex sintered body, comprising:
a lamination of a layer comprising a zirconia sintered body comprising 0.5% or more by mole and less than 4% by mole of an oxide of cerium in terms of $CeO_2$, 2% or more by mole and less than 6% by mole of yttria and

0.1% or more by mass and less than 2% by mass of an oxide of aluminum, a balance being zirconia, the oxide of cerium containing trivalent cerium, and the zirconia having a crystal structure including a tetragonal structure; and at least one of:

a layer comprising a zirconia-based sintered body comprising 2.0% or more by mass and 20.0% or less by mass of an oxide of aluminum, a balance being zirconia-comprising 2% or more by mole and less than 6% by mole of yttria, and a layer comprising a zirconia-based sintered body containing 2% or more by mole and less than 6% by mole of yttria and a coloring agent, a balance being zirconia, a lightness L* being 10 or more and 75 or less, a hue a* being −3 or less or 3 or more, a hue b* being −3 or less or 3 or more, a chroma C* being 1 or more and 30 or less in an L*a*b* color system, wherein a thickness of the complex sintered body is 2.0 mm or more, a ratio of a thickness of the zirconia-based sintered body to a thickness of the layer comprising the zirconia sintered body is 4.0 or more and 8.0 or less, and a proportion of a reflectance of the zirconia-based sintered body at a sample thickness of 0.3 mm and a measurement wavelength of 580 nm to the reflectance at a measurement wavelength of 650 nm is 0.7 or more and 2.5 or less.

2. The complex sintered body according to claim 1, wherein the lamination comprises the layer comprising the zirconia sintered body comprising 0.5% or more by mole and less than 4% by mole of the oxide of cerium in terms of $CeO_2$, 2% or more by mole and less than 6% by mole of yttria, and 0.1% or more by mass and less than 2% by mass of the oxide of aluminum, a balance being zirconia, the oxide of cerium comprising trivalent cerium, the zirconia having the crystal structure including a tetragonal structure; and the layer comprising the zirconia-based sintered body containing 2.0% or more by mass and 20.0% or less by mass of the oxide of aluminum, a balance being zirconia comprising 2% or more by mole and less than 6% by mole of yttria.

3. The complex sintered body according to claim 1, wherein the zirconia-based sintered body has a reflectance of 50% or more at a sample thickness of 2.5 mm and a measurement wavelength of 650 nm.

4. The complex sintered body according to claim 1, wherein the zirconia-based sintered body has a color with a lightness L* of 70 or more and 100 or less, a hue a* of more than −3 and less than 3 and a hue b* of more than −3 and less than 3 in the L*a*b* color system.

5. The complex sintered body according to claim 1, wherein the lamination comprises the layer comprising the zirconia sintered body containing 0.5% or more by mole and less than 4% by mole of the oxide of cerium in terms of $CeO_2$, 2% or more by mole and less than 6% by mole of yttria and 0.1% or more by mass and less than 2% by mass of the oxide of aluminum, the balance being zirconia, the oxide of cerium comprising trivalent cerium, and the zirconia having a crystal structure including a tetragonal structure; and the layer comprising the zirconia-based sintered body comprising 2% or more by mole and less than 6% by mole of yttria and the coloring agent, a balance being zirconia, the lightness L* being 10 or more and 75 or less, the hue a* being −3 or less or 3 or more, the hue b* being −3 or less or 3 or more, the chroma C* being 1 or more and 30 or less in the L*a*b* color system.

6. The complex sintered body according to claim 5, wherein the coloring agent is one or more elements selected from the group consisting of manganese (Mn), iron (Fe), cobalt (Co), nickel (Ni), copper (Cu), titanium (Ti), zinc (Zn), aluminum (Al), lanthanum (La), praseodymium (Pr), neodymium (Nd), europium (Eu), gadolium (Gd), terbium (Tb), dysprosium (Dy), holmium (Ho), erbium (Er) and ytterbium (Yb).

7. The complex sintered body according to claim 5, wherein the coloring agent is present in an amount of 0.01% or more by mass and 30% or less by mass.

8. The complex sintered body according to claim 1, wherein zirconia crystal grains in the zirconia sintered body have an average crystal grain size of 2 μm or less.

9. The complex sintered body according to claim 1, wherein the layer comprising the zirconia sintered body has a color satisfying $20 \leq L^* \leq 60$, $30 \leq a^* \leq 60$ and $0.9 \leq a^*/b^*$.

10. The complex sintered body according to claim 1, wherein the oxide of aluminum in the layer comprising the zirconia sintered body is one or more compounds selected from the group consisting of spinel, lanthanum aluminate and aluminum oxide.

11. The complex sintered body according to claim 1, wherein a ratio of a thickness of the zirconia-based sintered body to a thickness of the layer comprising the zirconia sintered body is 5.0 or more and 6.7 or less.

12. A method for producing the complex sintered body according to claim 1, comprising:

sintering a green body in a reducing atmosphere, the green body comprising a layer containing 2% or more by mole and less than 6% by mole of yttria, 0.5% or more by mole and less than 4% by mole of an oxide of cerium in terms of $CeO_2$ and 0.1% or more by mass and less than 2% by mass of an oxide of aluminum, a balance being zirconia, and at least one of:

a layer comprising 2% or more by mole and less than 6% by mole of yttria and 2.0% or more by mass and 20.0% or less by mass of an oxide of aluminum, a balance being zirconia, and a layer comprising 2% or more by mole and less than 6% by mole of yttria and a coloring agent, a balance being zirconia.

13. The method for producing the complex sintered body according to claim 12, wherein the sintering comprises a primary sintering by subjecting the green body to pressureless sintering in an oxidizing atmosphere to produce a primary sintered body and a secondary sintering by subjecting the primary sintered body to pressureless sintering in a reducing atmosphere.

14. A member, comprising the complex sintered body according to claim 1.

15. A complex sintered body, having a structure in which two or more sintered bodies having different compositions laminated by sintering and comprising:

a lamination of a layer comprising a zirconia sintered body comprising 0.5% or more by mole and less than 4% by mole of an oxide of cerium in terms of $CeO_2$, 2% or more by mole and less than 6% by mole of yttria and 0.1% or more by mass and less than 2% by mass of an oxide of aluminum, a balance being zirconia, the oxide of cerium containing trivalent cerium, and the zirconia having a crystal structure including a tetragonal structure; and at least one of a layer comprising a zirconia-based sintered body comprising 2.0% or more by mass and 20.0% or less by mass of an oxide of aluminum, a balance being zirconia containing comprising 2% or more by mole and less than 6% by mole of yttria, and a layer comprising a zirconia-based sintered body containing 2% or more by mole and less than 6% by mole of yttria and a coloring agent, a balance being zirconia, a lightness L* being 10 or more and 75 or less, a hue a* being −3 or less or 3 or more, a hue b* being −3 or less or 3 or more, a chroma C* being 1 or more and 30 or less in an L*a*b* color system, wherein a thickness of the complex sintered body is 2.0 mm or more and a ratio of a thickness of the zirconia-based sintered body to a thickness of the layer comprising the zirconia sintered body is 1.0 or more and 10.0 or less, and a proportion of a reflectance of the zirconia-based sintered body at a sample thickness of 00.3 mm and a measurement wavelength of 580 nm to the reflectance at a measurement wavelength of 650 nm is 0.7 or more and 2.5 or less.

16. The complex sintered body according to claim 1, wherein the zirconia-based sintered body comprises 2.0% or more by mass and less than 20.0% by mass of the oxide of aluminum.

17. A complex sintered body, comprising:

a lamination of a layer comprising a zirconia sintered body comprising 0.5% or more by mole and less than 4% by mole of an oxide of cerium in terms of CeO$_2$, 2% or more by mole and less than 6% by mole of yttria and 0.1% or more by mass and less than 2% by mass of an oxide of aluminum, a balance being zirconia, the oxide of cerium containing trivalent cerium, and the zirconia having a crystal structure including a tetragonal structure; and at least one of:

a layer composed of comprising a zirconia-based sintered body containing comprising 2.0% or more by mass and 20.0% or less by mass of an oxide of aluminum, a balance being zirconia comprising 2% or more by mole and less than 6% by mole of yttria, and a layer comprising a zirconia-based sintered body containing 2% or more by mole and less than 6% by mole of yttria and a coloring agent, a balance being zirconia, a lightness L* being 10 or more and 75 or less, a hue a* being −3 or less or 3 or more, a hue b* being −3 or less or 3 or more, a chroma C* being 1 or more and 30 or less in an L*a*b* color system in response to light from an external source, wherein a ratio of a thickness of the zirconia-based sintered body to a thickness of the layer comprising the zirconia sintered body is 4.0 or more and 8.0 or less, and a proportion of a reflectance of the zirconia-based sintered body at a sample thickness of 0.3 mm and a measurement wavelength of 580 nm to the reflectance at a measurement wavelength of 650 nm is 0.7 or more and 2.5 or less.

18. A complex sintered body, having a structure in which two or more sintered bodies having different compositions laminated by sintering and comprising:

a lamination of a layer comprising a zirconia sintered body comprising 0.5% or more by mole and less than 4% by mole of an oxide of cerium in terms of CeO$_2$, 2% or more by mole and less than 6% by mole of yttria and 0.1% or more by mass and less than 2% by mass of an oxide of aluminum, a balance being zirconia, the oxide of cerium containing trivalent cerium, and the zirconia having a crystal structure including a tetragonal structure; and at least one of:

a layer comprising a zirconia-based sintered body comprising 2.0% or more by mass and 20.0% or less by mass of an oxide of aluminum, a balance being zirconia comprising 2% or more by mole and less than 6% by mole of yttria, and a layer comprising a zirconia-based sintered body containing 2% or more by mole and less than 6% by mole of yttria and a coloring agent, a balance being zirconia, a lightness L* being 10 or more and 75 or less, a hue a* being −3 or less or 3 or more, a hue b* being −3 or less or 3 or more, a chroma C* being 1 or more and 30 or less in an L*a*b* color system in response to light from an external source, wherein a ratio of a thickness of the zirconia-based sintered body to a thickness of the layer comprising the zirconia sintered body is 1.0 or more and 10.0 or less, and a proportion of a reflectance of the zirconia-based sintered body at a sample thickness of 0.3 mm and a measurement wavelength of 580 nm to the reflectance at a measurement wavelength of 650 nm is 0.7 or more and 2.5 or less.

* * * * *